Dec. 16, 1969   R. A. HARVEY   3,483,699
FUEL INJECTOR FOR A GAS TURBINE ENGINE
Filed Jan. 29, 1968   2 Sheets-Sheet 1
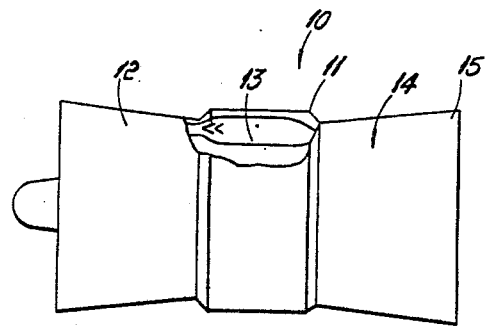
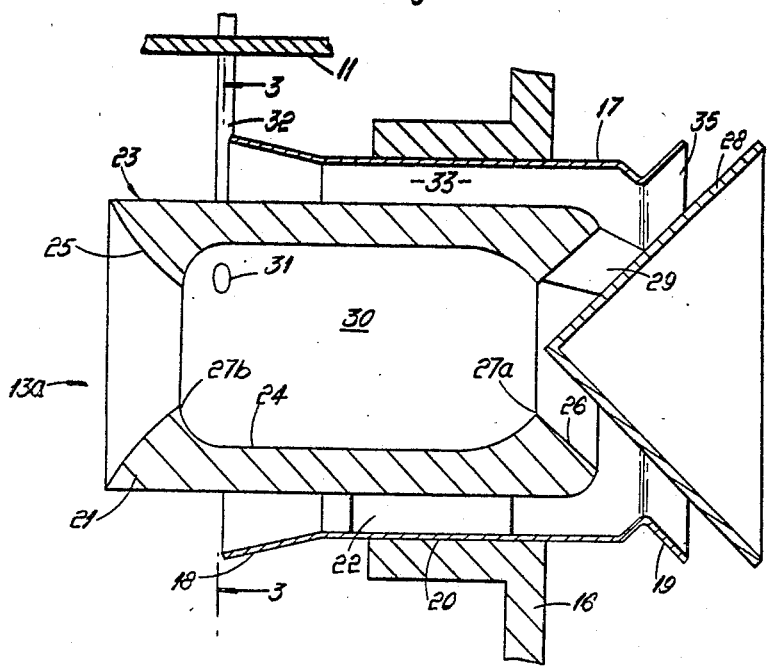
Inventor
Richard Alfred Harvey
By Cushman, Darby & Cushman
Attorneys

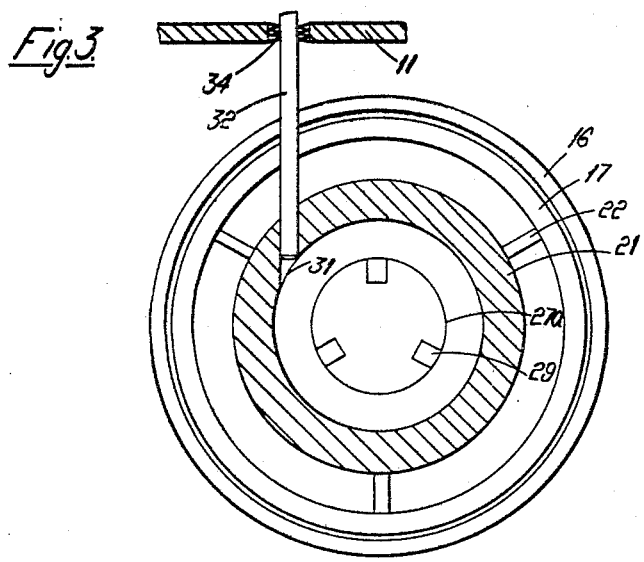

United States Patent Office 3,483,699
Patented Dec. 16, 1969

3,483,699
FUEL INJECTOR FOR A GAS TURBINE ENGINE
Richard Alfred Harvey, Derby, England, assignor to Rolls-Royce Limited, Derby, England, a British company
Filed Jan. 29, 1968, Ser. No. 701,227
Claims priority, application Great Britain, Feb. 22, 1967, 8,539/67
Int. Cl. F02g *1/00, 3/00*
U.S. Cl. 60—39.74                    7 Claims

ABSTRACT OF THE DISCLOSURE

A fuel injector for a gas turbine engine comprises a hollow central body, and an outer body which surrounds the central body and defines a flow passage therebetween, the flow passage and the interior of said central body being supplied with compressed air. There is a fuel supply pipe which passes through the outer casing of the engine and terminates within a tangential fuel inlet aperture formed in the central body to form an annulus of fuel flowing downstream therein, and a deflector is provided for deflecting the flow of fuel and compressed air from said interior in the direction of the flow of compressed air from said flow passage.

---

This invention relates to fuel injectors for gas turbine engines.

According to the present invention, there is provided a fuel injector for a gas turbine engine which has an outer casing, the fuel injector comprising a hollow annular central body, an outer body which is rigidly secured to and within the flame tube and which at least partly surrounds said central body to define a flow passage therebetween, said flow passage and the interior of said central body being adapted to be supplied with compressed air, the wall of said central body being formed with a fuel inlet aperture which is substantially tangential to the flow passage within the central body, a fuel pipe for supplying fuel to the internal surface of the central body to form an annulus of fuel flowing downstream therein, the said fuel pipe passing through the said outer casing and terminating within said wall, and deflecting means for deflecting the flow of fuel and compressed air from said interior in the direction of the flow of compressed air from said flow passage.

Preferably the downstream end of the internal surface of said central body is formed with an edge at which fuel is detached from said surface, and the upstream end of the internal surface of said central body may be formed with an inwardly curving lip.

Said central body may be rigidly secured to said outer body by means of a plurality of radial struts.

Preferably said means for deflecting the flow from the interior of said central body comprises a conical member.

The said conical member may be rigidly secured to said central body by means of struts, the apex of the cone being located adjacent the lip at the downstream end of the central body. Alternatively, the conical member may be rigidly secured to said central body by means of struts.

The fuel pipe is preferably connected to the outer casing by a sliding joint so as to accommodate differential thermal expansion between the outer casing and the flame tube.

The invention also includes a gas turbine engine provided with at least one fuel injector as set forth above.

The or each said fuel injector may form part of the main combustion equipment of the engine. Alternatively, or additionally, the or each said fuel injector may form part of the reheat combustion equipment of the engine.

The invention is illustrated, merely by way of example, in the accompanying drawings, in which:

FIGURE 1 is a diagrammatic elevational view, partially broken-away, of a gas turbine engine provided with a fuel injector in accordance with the present invention;

FIGURE 2 is a sectional view of the fuel injector shown in FIGURE 1, and

FIGURE 3 is a sectional view taken along the line 3—3 of FIGURE 2.

Referring to the drawings, a gas turbine engine 10 comprises an outer casing 11 within which there are mounted, in flow series, compressor means 12, combustion equipment 13, turbine means 14 and an exhaust assembly 15.

As can be seen more clearly in FIGURES 2 and 3, the combustion equipment 13 includes a fuel injector 13a mounted within a flame tube 16 which, in operation, is supplied with compressed air from the compressor means 12. Fuel is added in the flame tube 16 to the compressed air to form a fuel-air mixture which is then ignited, and the combustion products, after being cooled in a well-known manner, are led to the turbine means 14 which drives the compressor means 12, and the exhaust gases are expelled through the exhaust assembly 15.

Rigidly secured to the flame tube 16 is an annular entrainment member 17 which is open-ended both at its upstream end 18 (the left-hand end as seen in FIGURE 2) and at its downstream end 19. The entrainment member 17 is formed with a substantially cylindrical middle portion 20, but the upstream end 18 flares outwardly in the upstream direction, while the downstream end 19 flares outwardly in a downstream end direction.

A substantially cylindrical hollow atomiser body 21 is rigidly mounted within the entrainment member 17 by means of three angularly spaced apart radial struts 22, only one of which can be seen in FIGURE 2. In a modification, the central body 21 and the entrainment member 17 may be rigidly secured together by one strut 22 only.

While the outer surfaces 23 of the body 21 are substantially cylindrical, the inner surfaces 24 converge radially at both the upstream and downstream ends thereof to form edges or lips 27a and 27b. The body 21 is open at both ends, and the outer and inner surfaces 23, 24 are connected with oblique substantially radially extending faces 25, 26 at the upstream and downstream ends respectively. As will be seen in FIGURE 2, the face 25 flares in an upstream direction in going from the inner surface 24 to the outer surface 23, while the face 26 flares in a downstream direction between the surfaces 24, 23.

Mounted at the downstream end of the body 21 there is a conical member 28 which is rigidly secured thereto by means of three angularly spaced apart struts 29. The apex of the conical member 28 is just downstream of the edge or lip 27a and is on the longitudinal centre line of the body 21, while the mantle of the cone is at such an angle both to the face 26 of body 21 and to the downstream end 19 of the entrainment member 17 as to provide a substantially constant area flow passage.

The interior 30 of the body is adapted to be supplied, in operation, with fuel via an aperture 31 through the body 21. The aperture 31 is tangenitial to the interior 30 (FIGURE 3) and accommodates a radially extending fuel pipe 32 which extends through the outer casing 11.

In operation, compressed air flows through the interior 30 of the body 21 as well as through the annular space 33 between the entrainment member 17 and the body 21. Since the aperture 31 is tangential to the interior 30, fuel introduced therethrough will swirl round the interior 30 and form an annulus of fuel. The fuel will swirl with a downstream component and at the edge of lip 27a the central air stream will detach it as a thin sheet from the inner surface 24 of the body 21. This sheet of fuel may remain unbroken for a short distance, but as the conical member 28 deflects the air stream and the at least partially atomised fuel, the fuel will gradually mix with the air to produce a spray cone.

The air stream flowing through the space 33 will mix with the deflected fuel spray and the central air stream, thereby ensuring more complete atomisation of the fuel. It will be noted that the fuel will be entrained between two air flows which will tend to produce particularly good mixing and efficient atomisation, and these flows will also tend to prevent deposition of fuel on the upstream-facing surfaces of the conical member 28, as well as the downstream end 19 of the entrainment member 17.

Since the body 21, entrainment member 17 and the conical member 28 are all rigidly secured to the flame tube 16, it will be necessary to connect the fuel pipe 32 in such a way as to allow for differential thermal expansion between the outer casing 11 and the flame tube 16. This is achieved by a sliding joint 34 in the outer casing 11 through which the fuel pipe 32 passes.

It will be appreciated that by this means a very simple fuel injection arrangement is ensured which, while ensuring accurate location of the body 21, dispenses with spray nozzles and the like.

A further important feature of the invention is that the above-described structure provides a substantially large region 35 between the edge or lip 27a and the downstream end of the entrainment member 17 in which thorough mixing of the fuel with the air can take place. By suitably designing the apparatus, it can be arranged that the velocity of air flow in this region 35 is greater than the flame spread velocity. It is thus ensured that the flame cannot, in operation, penetrate further upstream than the region 35. Thus the efficiency of the fuel atomisation is preserved, and the interior 30 of the body, the fuel pipe outlet and the aperture 31 will be kept substantially free of carbon deposits.

It will be appreciated that while the fuel injector 13a of the present invention has been described as forming part of the main combustion equipment 13 of the gas turbine engine 10, additionally or alternatively it could form part of a reheat combustion equipment located in the exhaust assembly 15.

A number of structural modifications may be effected within the present invention. Thus the edges or lips 27a and/or 27b may be formed by the intersection of the outer and inner surfaces 23, 24 of the body 21 by making the outer surface 23 curve inwardly more sharply than the inward curvature of the inner surface 24. The conical member 28 may be secured to the entrainment member 17 rather than to the body 21.

The number of struts 22 may be increased from three and their inclination to the outer air flow may be made such as to induce some swirl therein. This swirling will assist the outermost layers of air flowing through the passage 33 to adhere to the downstream end 19 of the entrainment member 17 thereby further helping to prevent the deposition of fuel thereon.

I claim:
1. A fuel injector for a gas turbine engine which has an outer casing, the fuel injector comprising a hollow annular central body, an outer body which is rigidly secured to and within the flame tube and which at least partly surrounds said central body to define a flow passage therebetween, said flow passage and the interior of said central body being adapted to be supplied with compressed air, the wall of said central body being formed with a fuel inlet aperture which is substantially tangential to the flow passage within the central body, a fuel pipe for supplying fuel to the internal surface of the central body to form an annulus of fuel flowing downstream therein, the said fuel pipe passing through the said outer casing and terminating within said wall, and deflecting means for deflecting the flow of fuel and compressed air from said interior in the direction of the flow of compressed air from said flow passage.

2. A fuel injector as claimed in claim 10 wherein said fuel pipe is connected to said outer casing by a sliding joint so as to accommodate differential thermal expansion between the outer casing and the flame tube.

3. A fuel injector as claimed in claim 1 wherein the downstream end of the internal surface of said central body is formed with an edge at which fuel is detached from said internal surface.

4. A fuel injector as claimed in claim 1 wherein the internal surface of said central body, upstream of the portion thereof over which the fuel flows, is formed with an inwardly directed lip.

5. A fuel injector as claimed in claim 1 wherein said central body is rigidly secured to said outer body by means of at least one radial strut.

6. A fuel injector as claimed in claim 2 wherein said deflecting means comprises a conical member which is rigidly secured to said central body by means of struts, the apex of the cone being located adjacent the edge at the downstream end of the said internal surface.

7. A fuel injector as claimed in claim 6 wherein said conical member is rigidly secured to said central body by means of struts.

References Cited

UNITED STATES PATENTS 2,705,401    4/1955    Allen et al. _____ 60—39.74
2,771,744   11/1956    Johnson et al. _____ 60—39.74

MARK W. NEWMAN, Primary Examiner

DOUGLAS HART, Assistant Examiner